April 17, 1934.
P. GARDNER ET AL
1,955,282
BIAS CUTTING AND WIND-UP APPARATUS
Filed Dec. 19, 1931
5 Sheets-Sheet 2

INVENTORS
Percy Gardner
BY Harry Gerstein
Robert Hulsizer
ATTORNEY

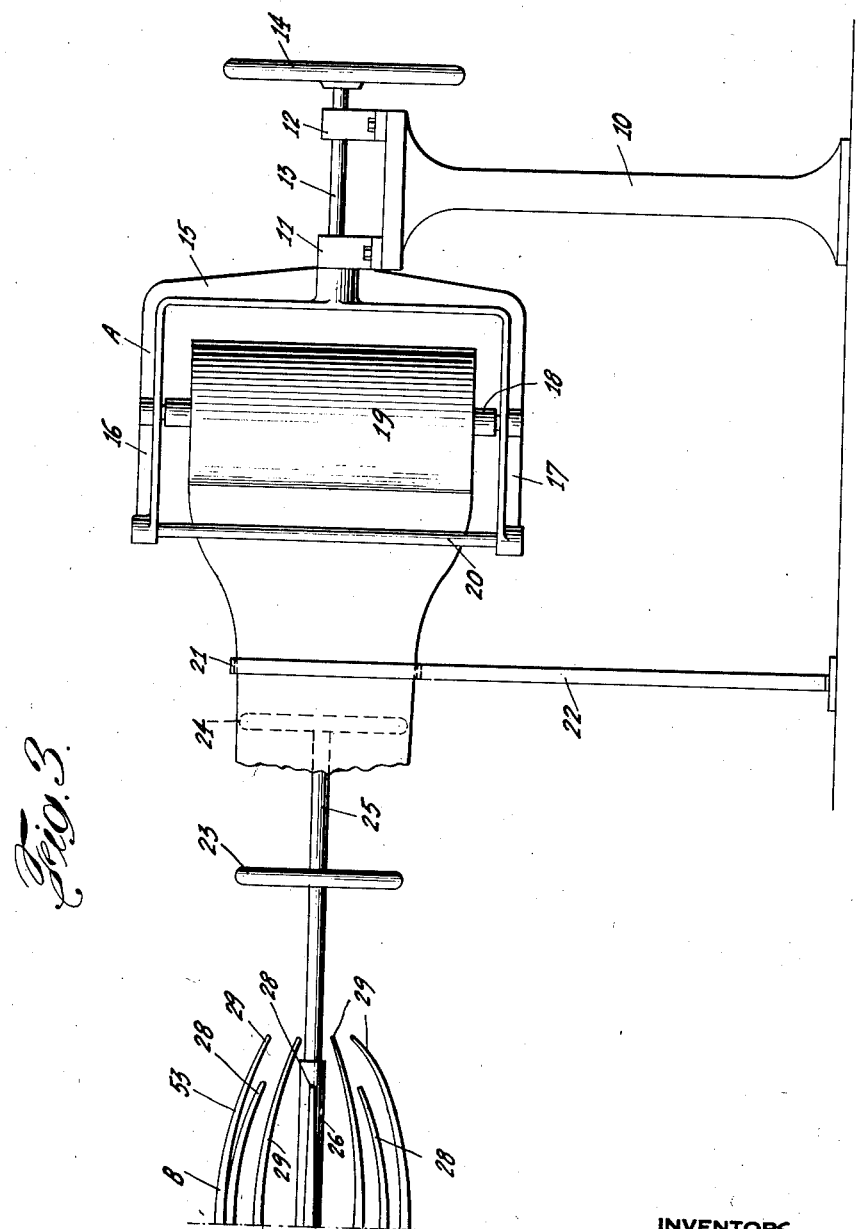

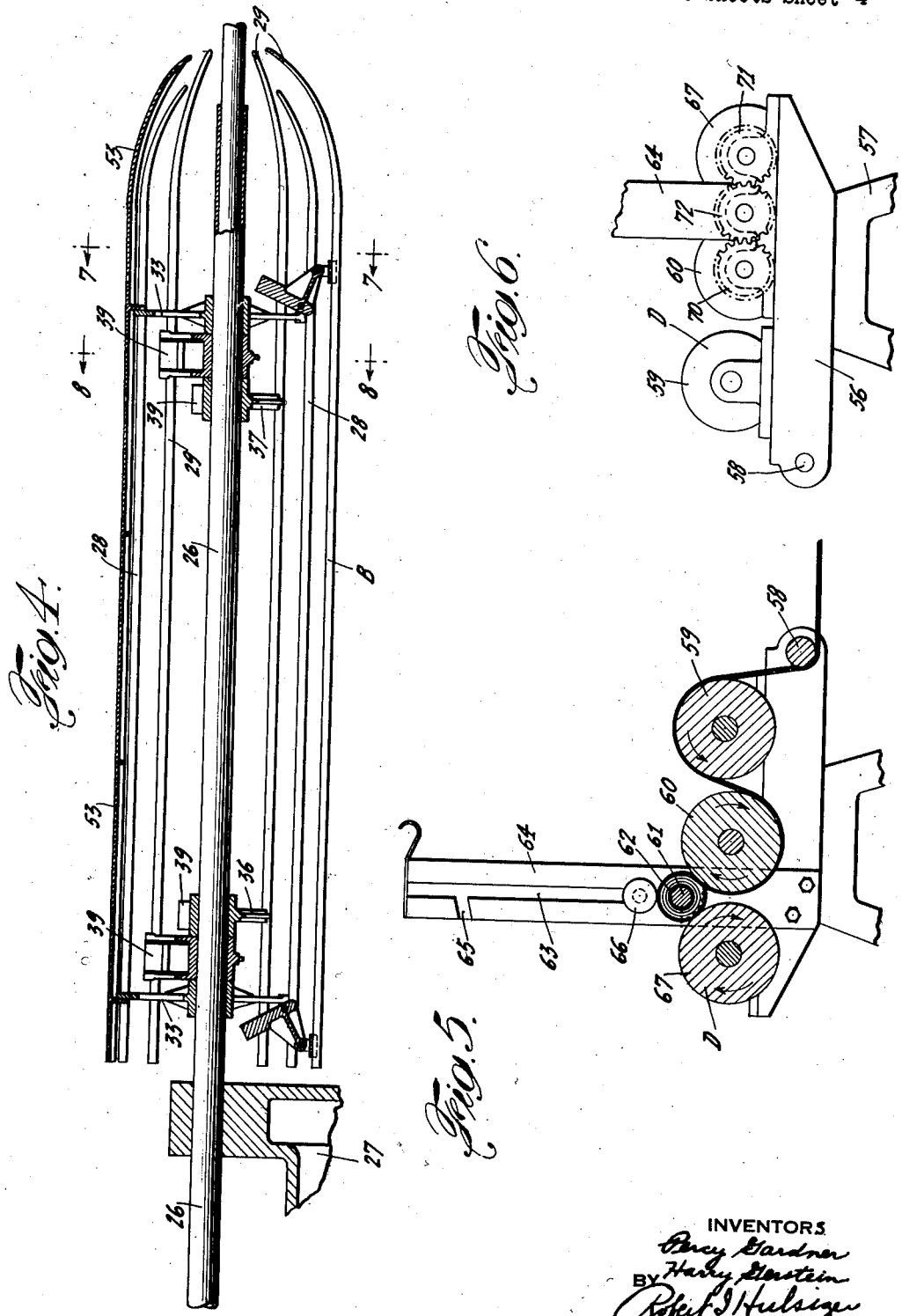

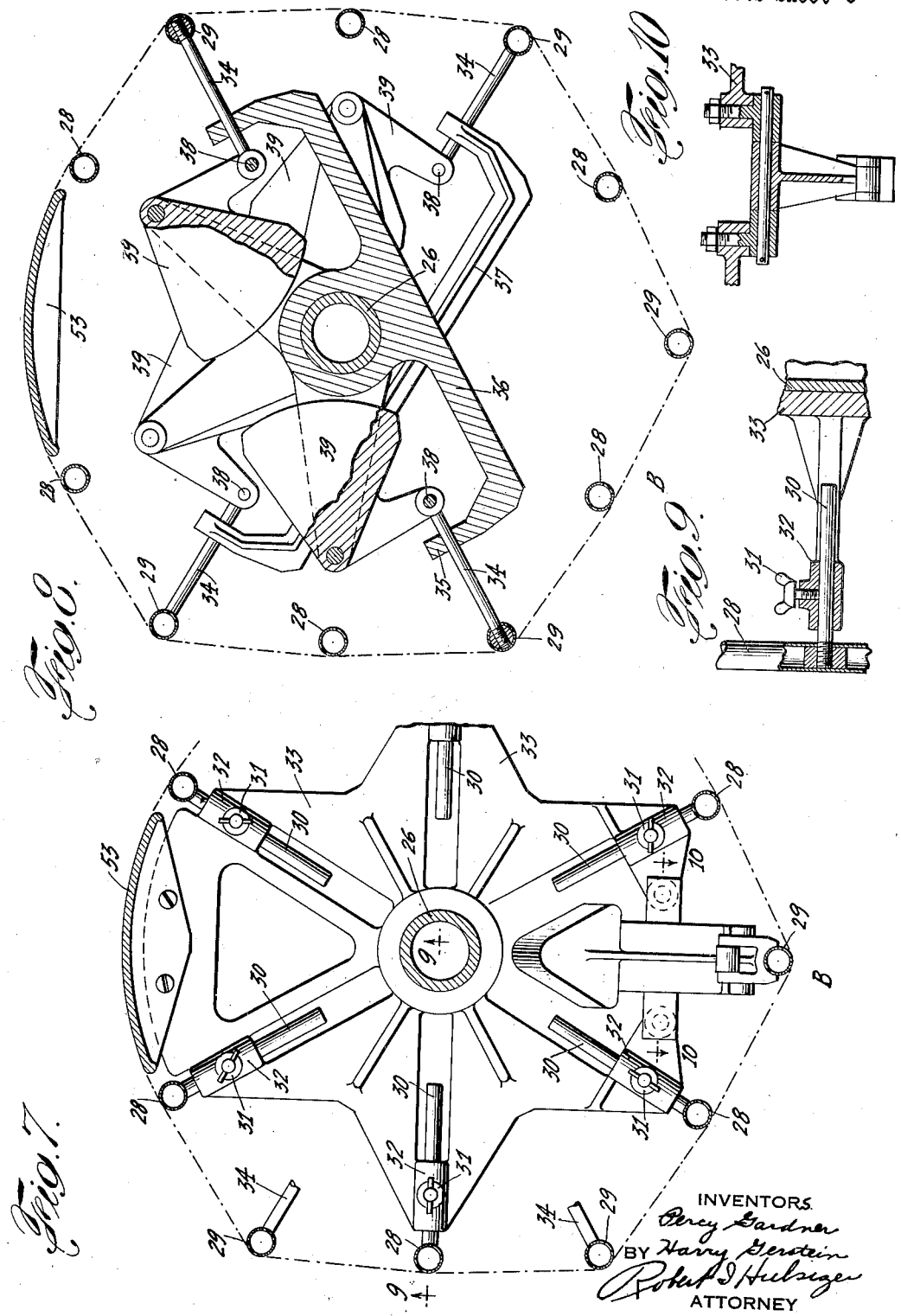

Patented Apr. 17, 1934

1,955,282

UNITED STATES PATENT OFFICE 1,955,282

BIAS CUTTING AND WIND-UP APPARATUS

Percy Gardner, New York, and Harry Gerstein, Arverne, N. Y., assignors to Lever Bias Machine Corporation, Brooklyn, N. Y., a corporation of New York Application December 19, 1931, Serial No. 582,116

14 Claims. (Cl. 164—65)

This invention relates to machines for cutting material on the bias and has particular reference to a machine in which the tubular material is drawn off a rotatable support over a mandrel in a spiral direction and pulled off and advanced over the mandrel by a device which simultaneously winds up the material, and a knife cutting the material on the bias as it passes over the mandrel.

A main object of the invention is to provide a simple and efficient means whereby the mechanism which winds up the bias cut material is itself effective to pull the material off of the mandrel and advance it thereover in this spiral direction.

A further object comprises the provision of a mechanism whereby the roll of wound-up material itself produces the necessary pulling friction to wind it up and to create the pull-off tension to pull off the material from the mandrel.

A still further object includes the provision of means for cutting the material on a bias at a given angle and pulling the material off the mandrel at that same angle properly tensioned and guided, so as to effect a substantially even cut and reduce to a minimum the necessity of shaving the ends of the wound-up roll.

A still further object includes a horizontally disposed mandrel provided with automatically expandable and contractable elements positioned for operation by the tubular material passing over the mandrel to maintain in the material a somewhat even tension regardless of changes in its diameter.

A still further object comprises the provision of simple and efficient means disposed between the mandrel and the support for the tubular material to open up the material and maintain it in an opened condition as it is pulled onto the mandrel thereby eliminating any tendency of the material to twist up and impede the operation of the machine.

A still further object is to provide a combination of cooperating mechanisms which will produce a smooth and evenly cut strip of bias material from a tubular fabric and automatically wind it up with relatively even edges on a roll with a minimum necessity for handling the goods after the machine has once been started to cut and wind up any given roll.

Further and more specific objects, features, and advantages will more clearly appear from the detailed description given below when taken in connection with the accompanying drawings which form part of the specification and which illustrate a present preferred form of the invention.

Briefly considered the invention comprises the combination of a mandrel, preferably horizontal, provided with automatically movable material engaging bars or elements to maintain the material under uniform tension as it passes over the mandrel, a rotatable support for the tubular material with means disposed between the mandrel and the support to open up the tube so that it will pass onto the mandrel easily, in further combination with a knife to cut the material on the bias at a given angle.

The machine further comprises a pull-off mechanism disposed adjacent one end of the mandrel and adapted to advance the material over the mandrel in a substantially spiral path and at substantially the same angle at which the material is cut. Said pull-off mechanism at the same time automatically winds up the cut material in roll form. An equally important feature of the invention is the provision whereby the material as it is being rolled up cooperates with elements driving it to creat the necessary pull on the material to advance it over the mandrel and pull it therefrom. Further features reside in details of construction which will be hereinafter described in the following detailed specification.

Embodying the above mentioned invention we have developed the present preferred form shown in the drawings, of which:

Fig. 3 is a partial side elevation showing the right-hand end of the machine including the end of the mandrel and the rotatable support for the tubular material;

Fig. 4 is a sectional view of the mandrel taken on the line 4—4 of Fig. 1;

Fig. 5 is a section through the wind-up device taken on the line 5—5 of Fig. 1;

Fig. 6 is an end elevation of the wind-up device;

Fig. 7 is a cross-section taken on the line 7—7 of Fig. 4;

Fig. 8 is a similar section taken on the line 8—8 of Fig. 4;

Fig. 9 is a section taken on the line 9—9 of Fig. 7; and

Fig. 10 is a section taken on the line 10—10 of Fig. 7.

Figure 2:
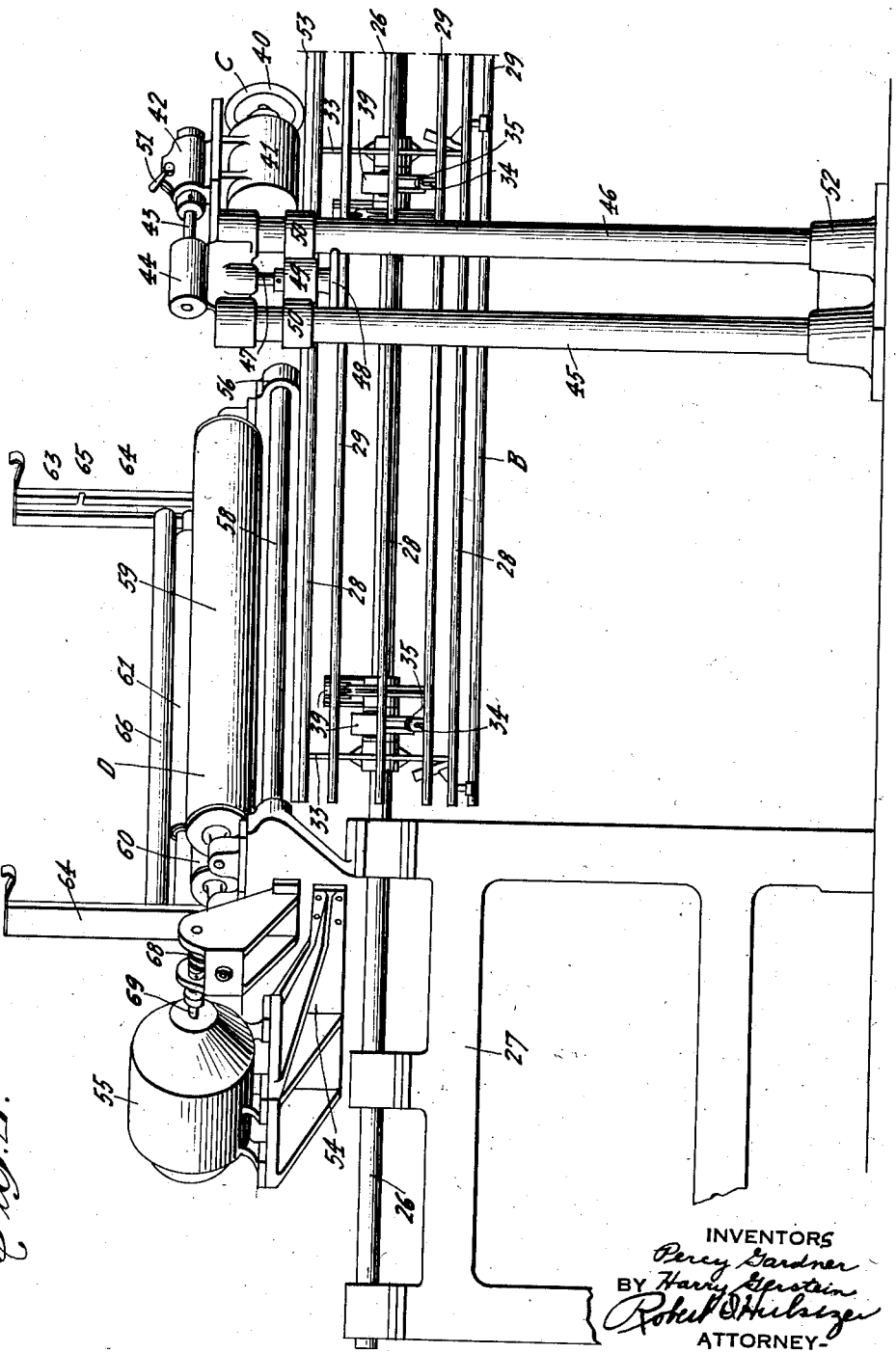
Fig. 2 is a partial side elevation of the apparatus showing a part of the mandrel, the cutting knife, and the wind-up device.

The invention shown in the drawings essentially includes a rotatable support generally denoted A in Fig. 3, on which a roll of tubular material is rotatably mounted and this support is manually and axially operated in accordance with the speed of the movement of the material over the mandrel as indicated generally by the letter B in Fig. 2. The material is fed over this mandrel in a spiral direction and is cut by a rotatable knife indicated by the letter C. The feed of the material over the mandrel in a spiral direction is effected by a combination pull-off and wind-up device indicated generally by the letter D in Fig. 2. From this general outline it will be seen that the device comprises preferably a horizontally disposed mandrel over which tubular material is advanced from a rotatable manually operable support and that as it is advanced in a spiral path over the mandrel it is cut by a knife disposed at an angle to the axis of the mandrel so as to create a bias cut. The pull of the material which causes the feed of the material over the mandrel is effected by the combination pull-off and wind-up device, because the roll of material which is being wound up cooperates with certain power driven rollers to effect not only the wind-up of the material on the roll but to create a sufficient pull on the material to advance it along the mandrel. As the material is thus feeding off the mandrel it is simultaneously wound up on the same roll which creates the pull and after all the material has passed and has been pulled off the mandrel it is already wound-up on the roll ready for further commercial operation.

This enables the material to pass from the tubular condition over the mandrel to be cut and to be wound-up substantially automatically at a rapid rate and with an unusual degree of evenness in the manner in which it is cut and wound-up on the roll so that after the roll of finished material is wound up the amount of edge trimming required is reduced to a minimum thereby saving a considerable amount in waste material. Winding the material up on a roller coincident with the pull off of the material and using the wound up material as an essential element in the operation of the pull-off device is a combined cooperation of elements which eliminates the usual necessity of permitting the material to drop into a box, or on the other hand, to have a separate winding mechanism associated with the apparatus to take the material from the pull-off device and wind it up. Previously when such separate wind-up mechanisms have been used and operated at the same time as the material was being pulled off of the mandrel, this wind-up mechanism had to be synchronized in speed with the speed of the material across the mandrel and this necessity introduced considerable complications into the manufacture of such machines and their method of operation.

Rotatable support

Referring to Fig. 3 there is shown the rotatable support A for the roll of tubular material, this support comprises a pedestal 10 having spaced bearings 11 and 12 supporting a shaft 13 mounted frictionally therein. This shaft has an operating hand wheel 14 at one end and a spider 15 at the other, between the arms 16 and 17 of which a core shaft 18 is rotatably mounted in any suitable manner. On this core shaft is disposed the roll 19 of material which has been formed in a tube in any suitable manner. This material is adapted to pass between the guide bars closely disposed adjacent each other at the end of the spider and one of which 20 is shown in Fig. 3. As the material is advanced off this roll it passes through a ring 21 mounted on an up-right 22 and then passes over two spaced circular elements 23 and 24 preferably in the form of wooden disks mounted on an extension 25 of the shaft 26 of the mandrel member B. These disks and the ring 21 effect in a simple manner the opening up of the tubular material so that it passes onto the mandrel in the fully extended condition and with a minimum tendency to twist or to be pulled out of shape. The fact that the material is advanced over the mandrel in a spiral direction requires that the spider or support A be turnable proportionate to the turning speed of the material and this is effected by having an operator stand adjacent the support A and turn the hand wheel 14. If the hand wheel is not turned the friction between the shaft 13 and its bearing is such that the support will not freely rotate and the material will be twisted in such condition that it cannot be advanced across the mandrel and will tear or rip and stop the operation of the machine.

The mandrel

Referring to Figs. 6, 7, and 8, it will be seen that the mandrel comprises the shaft 26 supported at one end in a rigid frame 27 mounted on the floor and extending toward the support A. This mandrel is made of a series of substantially fixed longitudinally disposed bars 28 and an alternate series of movable longitudinally disposed bars 29 arranged roughly preferably in the form of a circle and constituting members over which the tubular material passes. The circular form is preferred but the bars may be arranged in square formation or any other suitable formation, if desired. The bars 28 are mounted at opposite ends on stub shafts 30 and are adjustable by means of set screws 31 in suitable bearing blocks 32 disposed on a spider plate 33 so that the temporary fixed disposition of the bars 28 from the shaft 26 can be adjusted. By this means the average diameter of the mandrel may be changed at will to accommodate smaller or larger tubes of material, and thus extend the range of use of the mandrel. Each of the bars 29 adjacent opposite ends, is connected to the rods 34, the other ends of which pass through bearings 35 in the spider plates such as 36 and 37 and are connected as at 38 to weighted elements 39. These weighted elements 39 are pivotally supported on the plates 36 and 37 in such a manner as to make use of gravity and move the rods 34 normally to such position that the bars 29 are normally held at their greatest distance from the center of the shaft 26 so that when no material is passing over the mandrel the series of longitudinal bars are presented in their maximum outward position. However, when the tubular material is first introduced over the mandrel, starting the operation of the machine, the diameter of the material is also somewhat smaller than the normal diameter of the mandrel and the pressing action of the material on the movable bars 29 presses them inwardly against the action of the weights 39 until they assume a position permitting the passage of the material over the mandrel. Thus the bars 29 by reason of the action of the weights 39 are at a plurality of spaced points throughout the circumference of the tubular material, and along its length, pressing firmly and evenly on the material to hold it under substantially constant tension. It is well known that no material can be sewed into a tubular form without there being some variation in the diameter from point to point. Therefore, as this tubular material is fed over the mandrel and its diameter slightly varies, nevertheless the tension therein is maintained constant by the fact that the bars automatically expand and contract under the action of the weights to keep this tension even. It is to be noted that maintaining an even tension in the material as it is drawn over the mandrel is a very essential factor in producing an even, smooth, straight line bias cut. It is also to be noted that when material is cut along the bias in as near a straight line as possible and is then evenly wound up the roll thus produced has a substantially even edge and a minimum amount of material has to be cut off the ends of the roll and thrown away. When hundreds of thousands of yards of material are wound up in a short space of time it will be perceived that this possible waste of material constitutes a considerable factor in the cost of manufacture of the material and hence it becomes insistently important to reduce it to a minimum.

*Cutting elements*

The cutting knife C is generally in the form of a carborundum wheel 40 mounted on a shaft of the motor 41 supported by a bored frame 42 adjustable along a shaft 43 fastened in a frame 44 slidably mounted on the top of up-right elements 45 and 46. A threaded shaft 47 connected to the hand wheel 48 passes through the threaded bearing 49 in a casting 50 fastened to the up-right elements 45 and 46 to permit the vertical adjustment of the cutting wheel. The longitudinal adjustment of the motor along the shaft 43 is effected by means of an adjustable handle 51 of any suitable type. Preferably the up-right elements 45 and 46 are mounted on a base plate 52 fastened to the floor so that the angular disposition of the knife C with respect to the axis of the mandrel is preferably fixed. As the knife is disposed in operative position it is adapted to have its lower periphery extended into a slot (not shown) in the top of a so-called baffle plate 53, supported along the top of the mandrel from the spider plates 33. The material is advanced along the mandrel across the top of this baffle plate which acts as a supporting surface for the material especially at the point where it is being cut.

*Combined pull-off and wind-up device*

Figure 1:
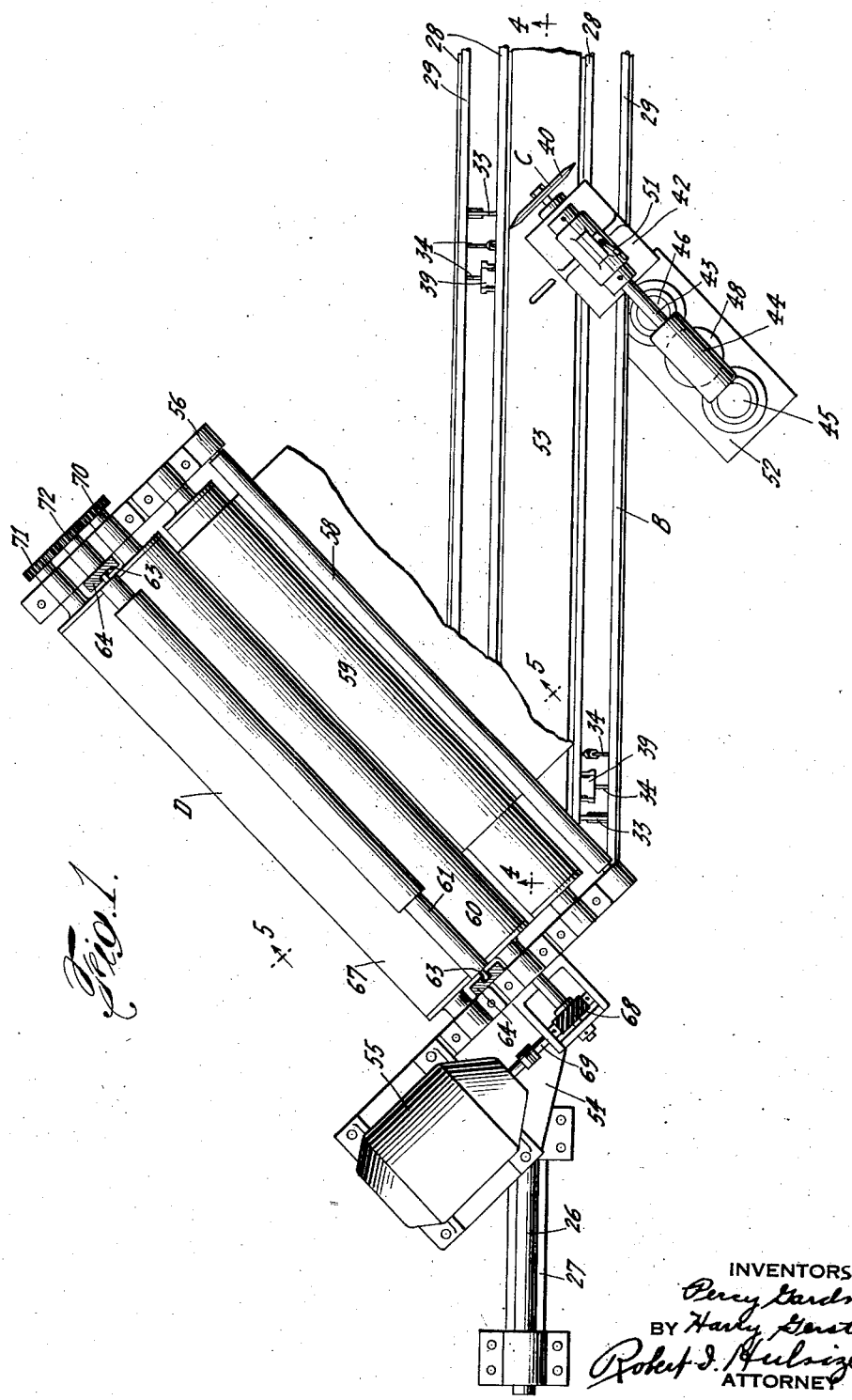
Fig. 1 is a partial plan view of the apparatus.

Examining Fig. 2 it will be seen that the frame 27 mounted on the floor supports the casting plate 54. This plate supports a motor 55 and acts as a support at one end for a plurality of rollers, the other ends of which are suitably borne in a plate 56 supported from the floor by a pedestal frame 57 (see Fig. 6). Preferably the disposition of the pull-off and wind-up mechanism is, as shown in Fig. 1, disposed axially parallel of the cutting motor shaft. In other words, the combined pull-off and wind-up device is disposed preferably at the same angle with respect to the axis of the mandrel as is the cutting knife 40. This insures that the material is pulled off the mandrel in exactly the same line as the material is cut by the knife 40 and in so establishing this relation the evenness of cut and wind-up is further insured.

As the material is pulled off of the mandrel it passes under an idler guide bar 58 and thence up over an idler roller 59, the material then passes underneath a driven roller 60 contacting with approximately half the periphery of said roller. It then passes over and is wound up on a core bar 61 over which a tube of material, such as cardboard 62 is slidably disposed so that after the material is wound up the core bar can be removed. This core bar 61 has its ends slidably disposed in a slot 63 formed in up-right plates 64 disposed on opposite ends of the wind-up device and having lateral entrance slots 65 in each plate to permit of the introduction of the ends of the core bar 61 into the slot 63. Preferably also a weighted and freely rotatable bar 66 is similarly disposed for movement in said slots and rests upon the roll of material being wound up.

Adjacent the driven roller 60 is another driven roller 67 driven in the same angular direction as the roller 60. The roller 60 has a worm gear (not shown) at one end meshing with a worm 68 on shaft 69 of the motor 55. At its opposite end the roller 60 has a gear 70 connected with a gear 71 on the adjacent end of the roller 67 through the intermediary of an idler gear 72. It will be noted that all of the rollers or guide members 58, 59, 60 and 67 are spaced from each other and that only the rollers 60 and 67 are power driven. It is also to be noted that the weight of the core bar 61, the roll of material being wound up thereon, and, when used, the weight of the bar 66 tends to press the rolled material downwardly onto the power driven rollers 60 and 67 and this pressure creates the frictional driving contact between the material being rolled up and the rollers 60 and 67 which not only effects the rolling up of the material but also is the frictional force which pulls the material off of the mandrel. The use of the various idler and power rollers such as 58, 59, 60 and 67 with their axes disposed parallel to each other create a proper even tension in the material and a practically perfect straight-line pull on the material which causes it to be wound up with practically an even edge requiring a very minimum necessity for shaving off the ends of the roll after it is wound up. The particular function of the idlers 58 and 59 is to smooth out the material before it gets to the rollers 60 and 67 and to create therein an initial even tension for it, which facilitates the smooth even wind-up. It will be observed that the material up until the time it reaches the knife it is in tubular form but after it leaves the knife it is in the form of a strip cut on the bias. This is the first apparatus known to the applicant in which the roll of material being wound up for further commercial use is employed in a positive manner to establish the necessary pull-off friction to pull the material off the mandrel. It will be further observed that the speed with which the material is pulled off the mandrel does not vary as the rolled up material increases in diameter and is only dependent upon the constant speed being given to the drive motor 55. This consistency which causes the friction drive between the roller 60 and 67 and the rolled up material is effected through the periphery of the material and the fact that the rollers 60 and 67 are driven at a constant speed causes the linear speed of the rolled up material to be the same no matter how big its diameter. As the roll increases in size it merely pushes the weight bar 66 further up into the slot 63.

While the present preferred form of the invention has been shown and described in detail, it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed, is:

1. A bias cutting machine comprising in combination a mandrel over which tubular material is advanced in a spiral direction, a manually rotatable support for said tubular material from which support said material is advanced to said mandrel, means for cutting the material at an angle to the axis of the mandrel, and means for utilizing the weight of the roll being wound up to create the necessary friction to pull the material over and off the mandrel and wind it up.

2. A bias cutting machine comprising in combination a mandrel over which tubular material is advanced in a spiral direction, a manually rotatable support for said tubular material from which support said material is advanced to said mandrel, means for cutting the material at an angle to the axis of the mandrel, and means for utilizing the weight of the roll being wound up to create the necessary friction to pull the material over and off the mandrel and wind it up, and a plurality of material engaging bars on the mandrel, and means for positioning said bars automatically to maintain an even tension in the tubular material as it is advanced over the mandrel.

3. A bias cutting machine comprising a horizontal mandrel over which tubular material is fed in a spiral direction, means for cutting said material into a strip at an angle to the axis of the mandrel, and means for utilizing the weight of the roll being wound up to create the necessary friction to pull the material over and off the mandrel and wind it up.

4. A bias cutting machine comprising a horizontal mandrel over which tubular material is fed in a spiral direction, means for cutting said material into a strip at an angle to the axis of the mandrel, and means for utilizing the weight of the roll being wound up to create the necessary friction to pull the material over and off the mandrel and wind it up, and means on the mandrel engaging the material during its movement over the mandrel to automatically maintain a constant tension therein regardless of variations in the diameter of the material.

5. A bias cutting machine comprising a mandrel over which tubular material is to be advanced in a spiral direction, means for cutting the material into a strip at an angle to the axis of the tube, and means for utilizing the weight of the roll being wound up to create the necessary friction to pull the material over and off the mandrel and wind it up.

6. A bias cutting machine comprising a mandrel over which tubular material is advanced, means for cutting a strip of material from said tube, and means for utilizing the weight of the roll being wound up to create the necessary friction to pull the material over and off the mandrel and wind it up.

7. A bias cutting machine comprising a horizontal mandrel, a manually rotatable support for tubular material, means for advancing the material over said mandrel in a spiral direction, and means disposed between the end of the mandrel and said support to open up said tube and maintain it open as it is advanced over the mandrel.

8. A bias cutting machine which comprises a mandrel over which tubular material is to be fed in a spiral direction, a manually rotatable support disposed adjacent the end of the mandrel and adapted to support a roll of tubular material and a disk disposed between the end of the mandrel and said support to receive and open up said tube and maintain it open as the tubular material is fed onto the mandrel.

9. A bias cutting machine comprising a mandrel over which tubular material is to be advanced in a spiral direction, a manually rotatable support for a roll of tubular material and disposed adjacent the end of the mandrel, a ring disposed adjacent the rotatable support through which said tubular material passes, and an opening disk disposed between the end of the mandrel and said ring to open said material and maintain it open as the material is advanced to the mandrel.

10. A bias cutting machine comprising a mandrel over which tubular material is to be fed in a spiral direction, a manually operable support for a roll of tubular material disposed adjacent the end of the mandrel, parallel guide elements disposed on the support closely adjacent each other and between which the tubular material passes in leaving the support, a ring adjacent the end of the support through which the tubular material passes, and a pair of spaced tube opening disks disposed between the end of the mandrel and said ring to open said tube and maintain it open as the material passes on to the mandrel.

11. A bias cutting machine which comprises a mandrel over which tubular material is fed in a spiral direction, means on the mandrel for automatically engaging the tube substantially throughout its length with substantially constant tension regardless of the variations in diameter of the tube, means for cutting a spiral strip from said tube, a plurality of guide rollers over which said strip passes after leaving the mandrel to smooth it out and maintain the tension therein, a plurality of spaced power driven rollers between which said material passes, a wind-up roller on which said material is wound up, said wind-up roller resting on at least one of said power driven rollers, the weight of the wind-up roller on at least one of said power driven rollers constituting sufficient means whereby the material can be wound up and the necessary tension in the material produced to pull it over and off the mandrel.

12. In combination a bias cutting machine comprising a mandrel over which tubular material is fed in a spiral direction, means for cutting a bias strip from said material, a pair of power driven rollers adjacent the mandrel, the axes of said rollers disposed at right angles to the normal line of movement of said strip in leaving the mandrel, the wind-up roller resting on said power driven rollers, said material adapted to be wound up on said last mentioned rollers the weight of said wind-up roller creating the necessary friction to cause the material to be pulled over and off the mandrel and wound up.

13. A bias cutting machine comprising a mandrel, means for advancing a strip of material over and pulling it off said mandrel, means for winding up said material on a roll, the weight of the rolled-up material alone creating substantially all the contact friction necessary to effect the pulling of the material over and off the mandrel and the wind-up thereof.

14. A bias cutting machine comprising a mandrel over which tubular material is fed in a spiral direction, means for cutting a bias strip from said material, a pair of spaced power driven rollers, a wind-up roller on which material is wound up, said wind-up roller resting on said power driven rollers, the peripheral contact between the wind-up roller and the said power driven rollers being substantially alone sufficient to wind-up the material and pull it over and off the mandrel.

PERCY GARDNER.
HARRY GERSTEIN.